Feb. 6, 1951  C. J. HOLSLAG  2,540,204
ARC WELDING ELECTRODE HOLDER
Filed Jan. 11, 1944
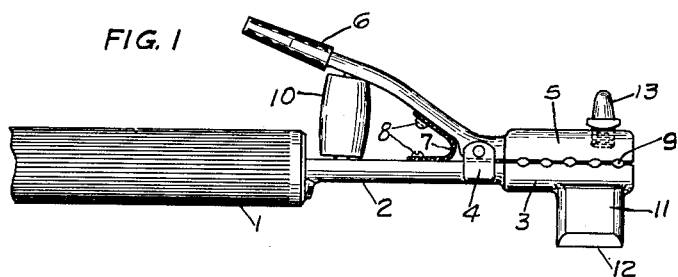
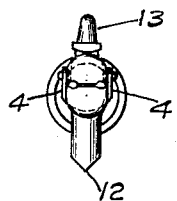
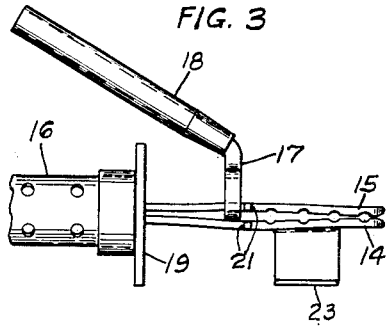
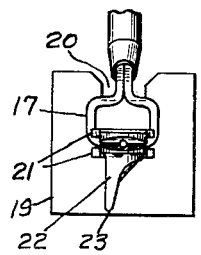
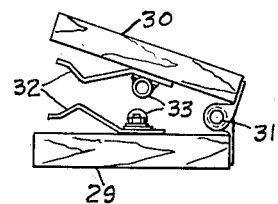
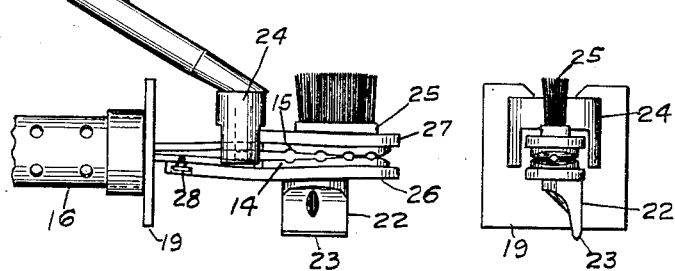
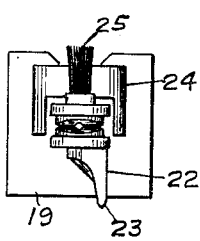
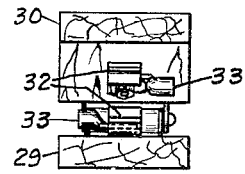
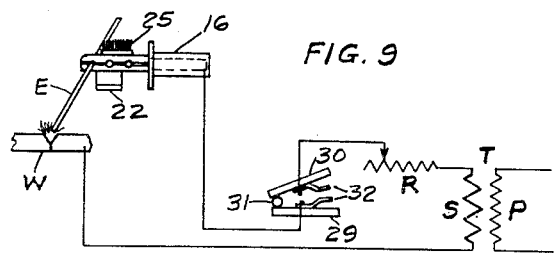
INVENTOR.
CLAUDE J. HOLSLAG
BY
A. D. T. Libby
Attorney Patented Feb. 6, 1951

2,540,204

UNITED STATES PATENT OFFICE 2,540,204

ARC WELDING ELECTRODE HOLDER

Claude J. Holslag, South Orange, N. J., assignor to Electric Arc, Inc., Newark, N. J.

Application January 11, 1944, Serial No. 517,770

4 Claims. (Cl. 219—8)

This invention relates to improvements in arc welding electrode holders.

In many types of covered electrodes used at the present time, the covering is not all dissipated during the welding operation and more or less slag is left over the deposited metal which should be cleaned off before putting down another layer. Sometimes a stiff wire brush may be used or, where the electrode coating is of such a character as to leave a tenacious slag, a hammer or hammer and chisel is required to force off the slag. Experience has shown that these miscellaneous tools are never where the operator can immediately get his hands on them after laying down a "bead," and during a day much time is lost, to say nothing of the deleterious effect on the weld being made due to the cooling of the metal, while the operator is hunting for the slag-cleaning tools.

It is therefore the principal object of my invention to provide an electrode holder having the necessary cleaning means forming an integral part of the holder, so that when a layer of weld is put down the operator can immediately, without the loss of a second, start cleaning operations.

My improvements are clearly shown in the annexed drawings wherein:

Figure 1 is a side elevation, on a reduced scale, of one form of an electrode holder with two forms of my new devices attached thereto.

Figure 2 is a view of just the right-hand end of Figure 1.

Figure 3 is a partial side elevation of a different type of holder carrying a modified form of cleaning device.

Figure 4 is an end view, right to left, of Figure 3.

Figure 5 is a view of the holder of Figure 3 insulatingly carrying two different types of cleaning devices.

Figure 6 is an end view, right to left, of Figure 5.

Figure 7 is a side elevation of a foot-switch preferably used with the holders of Figures 1 and 3.

Figure 8 is a view of Figure 7, looking from left to right.

Figure 9 is a diagrammatic view showing the foot switch of Figures 7 and 8 used with a holder wherein the cleaning devices are not insulated from the metal parts of the handle.

In the various views, wherein like numbers refer to corresponding parts, 1 is a welding handle of insulating material which carries, in any satisfactory manner, a good current-carrying member 2 that terminates in an electrode jaw or part 3. Pivoted to lugs 4, is a movable holder part 5 having a handle portion 6 of insulating material. Preferably, the parts 2, 3 and 5 are electrically joined by a flexible flat cable 7 of good current-conducting material such as copper, held in place by any satisfactory means as heavy screws 8. The jaws 3 and 5 are normally held in electrode-gripping position, via the electrode seats 9, by a double-acting expansible spring preferably covered by a flexible insulator 10.

So far the electrode holder, described, is of general design, but I have added the device 11, preferably of steel, thereto as by welding or brazing it to the jaw 3 at the end thereof. The device 11 has a relatively sharp edge 12 which will act to cut away the slag that forms over the welding layer, it being understood that the operator immediately uses the holder as a chipper when an electrode is used up or when occasion requires. In some cases, I may attach a hard metal device 13 to the jaw 5 as by screwing it into the jaw. The free end of the device 13 may be used to break away the slag or to peen the weld metal as is frequently done.

In Figures 3 and 4, the welding holder has jaws 14 and 15 inherently formed and anchored within the ventilated handle 16 so as to grip an electrode. The jaws are separated by a rectangularly shaped ring 17 which is positioned between the jaws 14 and 15 and terminates in an insulated handle 18. When pressure is applied to the handle 18, a camming action is produced by the ring 17 and the jaws are separated to insert an electrode or remove the stub of a used one. A shield 19, having a notch 20 for the operation of the handle 18, is positioned at the end of the handle 16. The jaws 14 and 15 have side projections 21 to locate the ring 17. Preferably, the jaw 14 has a slight recess therein to seat the ring 17. This electrode holder is also of standard design. I have applied thereto, as by welding or brazing to one jaw 14, a device 22 having one side straight and terminating in a chipping edge 23.

In Figures 5 and 6, the general form of the holder is the same as in Figures 3 and 4, except the ring 17 is covered with an insulator 24 of suitable kind and thickness, and the devices 22 and 25 are mounted respectively on high-heat-resisting insulators 26 and 27 that are fastened to their respective jaws 14 and 15 in any satisfactory manner as by screws 28, only one of which is shown in Figure 5. It will be noted that the heads of the screws are well below the surface of the insulators 26 and 27, so there will be no danger of their completing a circuit when the holder is being used to chip with the chipper 22, or cleaning with the stiff wire brush 25; and since the ring 17 is covered with insulation, the holder of Figures 5 and 6 may be used without a foot switch such as shown in Figures 7 and 8.

The foot switch is composed of two blocks 29 and 30 of insulating material, such as wood, fastened together by a hinge 31 that tends to normally hold them apart as in Figure 7. The block 29 carries a contact strip 32 and a terminal 33, and the block 30, a pair of identical parts.

In Figure 9, it will be seen, without any extended description, that current from the transformer T, having a primary P and a secondary S, passes through the reactor R, and to the foot switch, the contacts of which are normally open so the operator may put an electrode into the welding holder, or utilize the holder for chipping and cleaning, etc., without striking an arc or getting any shock. Where the devices, such as 22 and 25 as shown in Figure 9, are not insulated from the jaws of the holder, I prefer—in fact, it is very essential—that a foot switch be used, whereas with the construction of Figures 5 and 6, no foot switch is necessary.

I have shown certain devices and arrangements which may be varied considerably; for example, I may mount on one of the insulators, such as 26, a short brush like 25, and at the end, preferably the outer end, a device 13; or the brush 25 may extend the full length of either one of the jaws 14 or 15, while the other jaw has a device like 11, 13 or 22 mounted on the insulator, or a combination of these devices. The handle part 1 or 16 may be of any satisfactory type, only two forms being shown. Also, while I have shown electrode holders having two separable hinged jaws, the holder may be of some other form such, for example, as shown in Pierce Patent 1,293,538 or Allard Patent 1,565,406.

From what has been said, it will be seen that I have provided relatively simple improvements which will save time, and time is money, as well as means for securing better welds.

What I claim is:

1. The combination with an electrode holder of an electric arc welding tool, of a chipping hammer, and means for securing the chipping hammer to the electrode holder in electrically insulated relation with the holder, the said securing means for the chipping tool being designed to facilitate the setting of the tool with the working edge of the tool at any desired prescribed angle with respect to the electrode holder.

2. In an implement of the character stated including a handle and a pair of metallic arms extending therefrom and designed to function as a clamping means, a body of insulation material overlying one face of an arm, a chipping tool secured to said body of insulation, the tool comprising a solid, relatively long metallic body tapered at one end to form a cutting edge, the opposite end of the body being flattened to form an attaching plate, the attaching plate bearing against the body of insulation material and maintaining the tool in a position in which the cutting edge is directed away from the body of insulation material, and means carried by the body of insulation material and extending into said metallic body to secure the latter to the insulation material.

3. In an implement of the character stated including a handle and a pair of metallic arms extending therefrom and designed to function as a clamping means, a body of insulation material overlying one face of an arm, a chipping device secured to said body of insulation, the device comprising a solid body tapered at one end to form a cutting edge, the opposite end of the body being flattened to form an attaching plate, the attaching plate bearing against the body of insulation material and maintaining the device in a position in which the cutting edge is directed away from the body of insulation material, and cooperative means acting between said insulating material and said metallic body to secure the latter to the insulating material.

4. An implement of the character stated including a handle and a pair of metallic arms extending therefrom and designed to function as a clamping means for a welding electrode, a strip of insulating material fastened to at least one of said arms by screws, the heads of which are set into recesses in the insulation so they are well below the outer surface of the insulator, a cleaning device having a relatively large flat surface secured to said strip of insulating material, the tool having characteristics highly useful in the art of arc welding by cleaning the weld metal immediately after it is deposited whereby a welder can accomplish more and better work with a minimum of effort.

CLAUDE J. HOLSLAG.

REFERENCES CITED

The following references are of record in the file of this patent:

UNITED STATES PATENTS

| Number | Name | Date |
|--------|------|------|
| 126,544 | Heaton | May 7, 1872 |
| 163,277 | Strong | May 11, 1875 |
| 200,218 | Nicholson | Feb. 12, 1878 |
| 1,825,314 | Heckman | Sept. 29, 1931 |
| 1,883,807 | McIntire | Oct. 18, 1932 |
| 2,104,750 | Jones | Jan. 11, 1938 |
| 2,162,112 | Nickels | June 13, 1939 |
| 2,213,306 | Del Bene | Sept. 3, 1940 |
| 2,327,290 | Rice | Aug. 17, 1943 |

FOREIGN PATENTS

| Number | Country | Date |
|--------|---------|------|
| 15,040 | Great Britain | of 1906 |